(12) United States Patent
Youngwerth

(10) Patent No.: US 6,957,730 B1
(45) Date of Patent: Oct. 25, 2005

(54) CLUTCH APPARATUS WITH AUTOMATIC CENTRIFUGAL ENGAGEMENT OF PRESSURE PLATE

(76) Inventor: Albert J. Youngwerth, 4275 N. 36th St., Boise, ID (US) 83703

( * ) Notice: Subject to any disclaimer, the term of this patent is extended or adjusted under 35 U.S.C. 154(b) by 0 days.

(21) Appl. No.: 10/454,916

(22) Filed: Jun. 3, 2003

Related U.S. Application Data

(60) Provisional application No. 60/384,910, filed on Jun. 3, 2002.

(51) Int. Cl.[7] .............................................. F16D 43/12
(52) U.S. Cl. .................... 192/83; 192/105 B; 192/192; 192/103 A
(58) Field of Search .............................. 192/83, 105 B, 192/103 A, 56.6

(56) References Cited

U.S. PATENT DOCUMENTS

| | | | | |
|---|---|---|---|---|
| 1,682,493 A | * | 8/1928 | Ehrenfeld | ................ 192/105 B |
| 1,766,227 A | * | 6/1930 | Russell | .................... 192/105 B |
| 3,265,172 A | * | 8/1966 | Atsumi et al. | .............. 192/55.6 |
| 4,457,185 A | * | 7/1984 | Yoshida et al. | ........... 74/336 R |
| 5,638,935 A | * | 6/1997 | Fehring | ................... 192/105 B |
| 6,533,056 B1 | * | 3/2003 | Maimone | ..................... 180/230 |

FOREIGN PATENT DOCUMENTS

JP          55044166 A   *   3/1980   ........... F16D 43/06

* cited by examiner

Primary Examiner—Richard M. Lorence
(74) Attorney, Agent, or Firm—Belnap & Curtis, PLLC; Robert A. Huntsman

(57) ABSTRACT

An automatic clutch consisting of a centrifugally actuated pressure plate apparatus axially moveable relative to a clutch inner hub and rotationally coupled to a clutch outer basket. As the engine spins the clutch outer basket, the rotational coupling between the clutch outer basket and the centrifugal pressure plate causes the centrifugal pressure plate to move axially relative to the clutch inner hub and apply a force to driven clutch plates and driving clutch plates. The force exerted by the centrifugal pressure plate upon driven clutch plates and driving clutch plates causes the plates to couple, forcing engagement between the engine and transmission. Optionally, a variable spring tension may be applied through the clutch release mechanism to adjust the engine speed at which the clutch begins to engage.

11 Claims, 3 Drawing Sheets

US 6,957,730 B1

CLUTCH APPARATUS WITH AUTOMATIC CENTRIFUGAL ENGAGEMENT OF PRESSURE PLATE

CROSS-REFERENCE TO RELATED APPLICATIONS

This application is based upon provisional application 60/384,910 filed on Jun. 3, 2002.

FEDERALLY SPONSORED RESEARCH

Not applicable.

BACKGROUND OF THE INVENTION

This invention pertains to the field of clutch engaging/disengaging mechanisms. More particularly, it is a device for automatically engaging or disengaging the clutch based upon engine speed.

Most motorcycles incorporate a manual transmission coupled to the engine via a multi-plate clutch assembly. Typically, the multi-plate clutch is engaged/disengaged by the driver via a lever mounted on the handlebar. Although the lever operated clutch allows the driver to control the clutch engagement/disengagement, often times motorcycle drivers find the clutch lever difficult to operate smoothly. New riders have difficulty adjusting to smoothly engaging the clutch while operating the throttle to move the vehicle from a standing start. Experienced riders may need to partially disengage the clutch when traveling slowly to allow the engine to continue running without stalling. Motorcycle racers often have a difficult time controlling the engagement of the clutch and the application of the throttle to maximize acceleration. Off-road motorcycle racers often need to stop the rear wheel suddenly with the rear brake, causing the engine to stall if the clutch is not first disengaged. An automatic clutch can help overcome many of the problems associated with a manual clutch.

Automatic clutches for motorcycles have existed for more than 30 years, primarily for entry-level motorcycles with low power. More recently, retrofit automatic clutches for high-performance motorcycles have become available. Automatic clutches for high-performance motorcycles have many advantages over manual clutches. Currently available retrofit automatic clutches have several disadvantages:

Require replacement or changes to existing clutch parts. Most motorcycle clutch's pressure plates are spring loaded and attached to the clutch inner hub. However, a centrifugal clutch's pressure plate must spin with the clutch's outer basket which is coupled radially to the engine to provide engagement force. Existing retrofit automatic clutches require a modified clutch outer basket to bolt the new centrifugal pressure plate to.

Clutch lever override not possible at high engine speeds. Existing retrofit automatic clutches use a rigid centrifugal engagement mechanism. To disengage the clutch, the entire force of the centrifugal engagement mechanism must be overcome. At higher engine speeds, the increased centrifugal force of the engagement mechanism becomes difficult or impossible to overcome.

Too much centrifugal force at high engine speeds. The stock pressure plate provides a fixed amount of pressure to the clutch disks. The stock pressure plate force is limited to ensure the clutch can slip if excessive force is sent through the driveline. Existing retrofit automatic clutches transfer all of the force generated by centrifugal engagement mechanism into the clutch disks. At higher engine speeds, the excess centrifugal force can prevent the clutch from slipping in the event an excessive force is sent through the driveline. The excessive force traveling through the clutch may cause a failure in the engine or transmission.

Difficult to adjust automatic clutch. Adjusting the engine speed at which the clutch begins to engage and how quickly the clutch becomes fully engaged is important for proper operation of an automatic clutch. Existing automatic clutches require the operator to remove the engine cover to adjust the automatic clutch. Removal of the engine cover to adjust the clutch during riding is difficult for the rider.

Other automatic clutch solutions exist but all of the prior art fails to address all of the needs described.

Accordingly, it is an object of the invention to provide an apparatus for automatically engaging and or disengaging the clutch of a vehicle based upon engine speed.

It is another object of the invention to optionally provide a manual override to disengage the clutch via a driver operated handlebar lever. The driver operated handlebar lever should be able to disengage the clutch at any engine speed without excessive force at high engine speed.

It is another object of the invention to provide a means to limit the total amount of force the centrifugal pressure plate applies to the clutch disks.

It is another object of the invention to provide a means by which the engagement and disengagement speeds and the change in speed between engagement and disengagement, may be easily adjusted without opening the engine or transmission covers.

It is another object of the invention to minimize the cost of the automatic clutch engagement/disengagement apparatus and to minimize the difficulty in retrofitting it to an existing motorcycle.

BRIEF SUMMARY OF THE INVENTION

A centrifugal clutch engagement apparatus coupled axially to the clutch inner hub and coupled radially to the clutch outer basket. The centrifugal clutch engagement apparatus provides a means for external adjustment, a means for limiting total force into the clutch and a means to override the engagement of the centrifugal clutch engagement apparatus at any engine speed.

DRAWINGS—REFERENCE NUMERALS

1) Top Plate
2) Ball
3) Pressure Plate
4) Hole
5) Lifter Thrust Bearing
6) Lifter
7) Stand-Offs
8) Rotating Hub
9) Upper Thrust
10) Thrust Bearing 11) Lower Thrust
12) Driven Friction Plate
13) Driving Friction Plate
14) Clutch Inner Hub
15) Internal Edge
16) Clutch Outer Basket
17) Clutch Lifter Actuator
18) External Edge
19) Channel
20) Engine Case
21) Engine Power Source
22) Transmission Source
23) Clutch Lever

DETAILED DESCRIPTION OF THE INVENTION

Figure 1A:
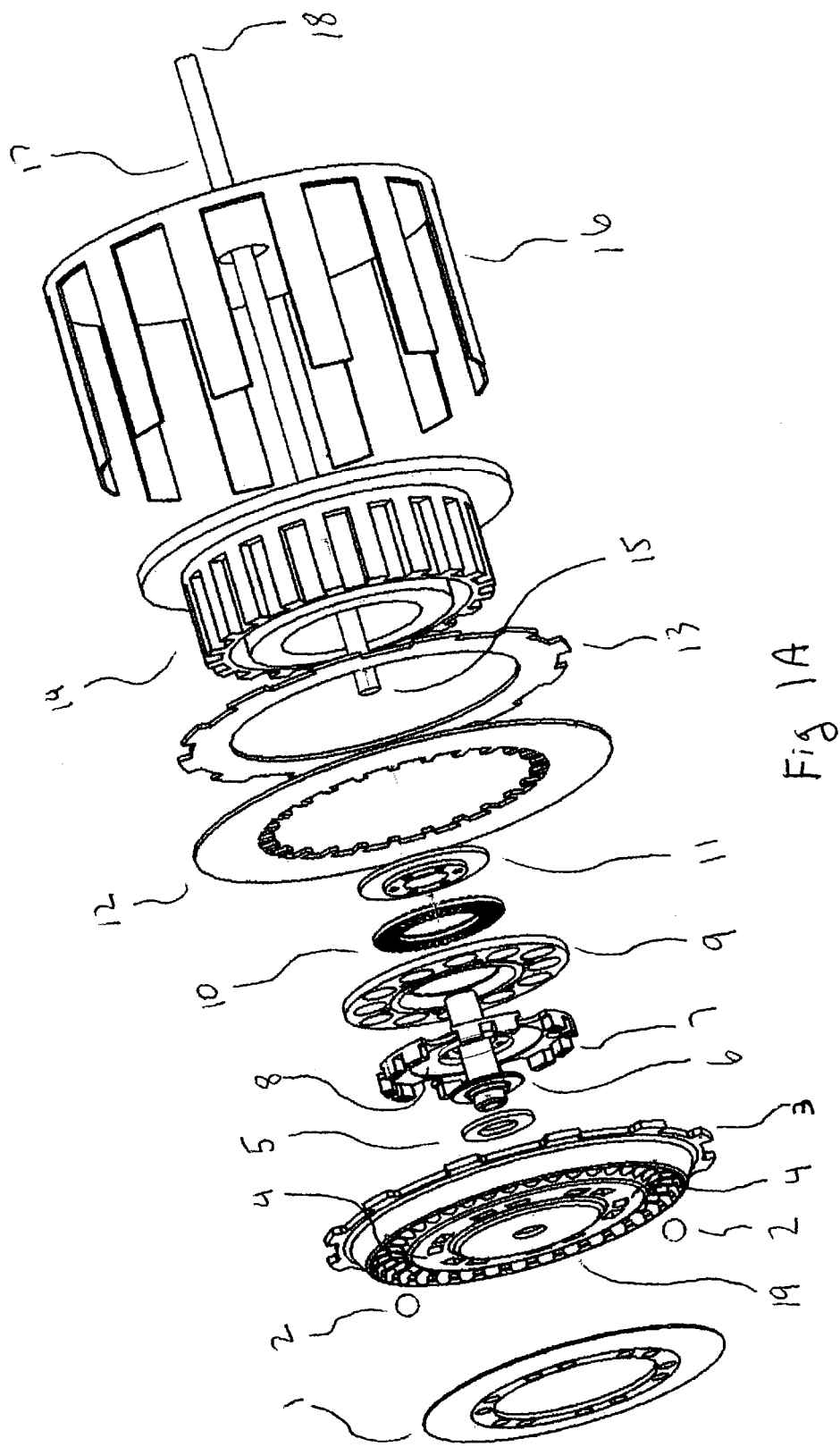
FIG. 1A is a rearward exploded isometric view of the preferred embodiment of the present invention.
Figure 1B:
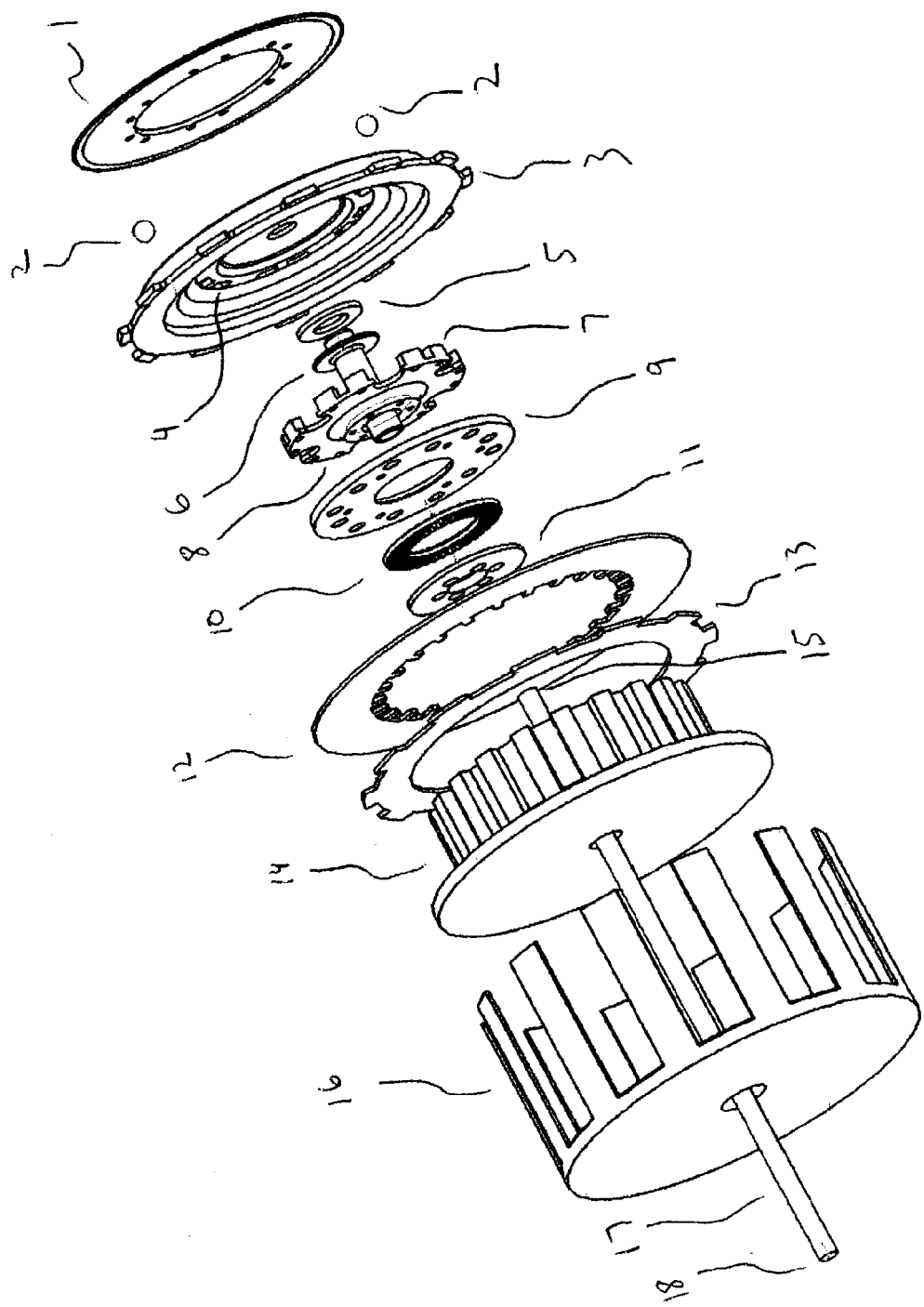
FIG. 1B is a forward exploded isometric view of the preferred embodiment of the present invention.
Figure 2:
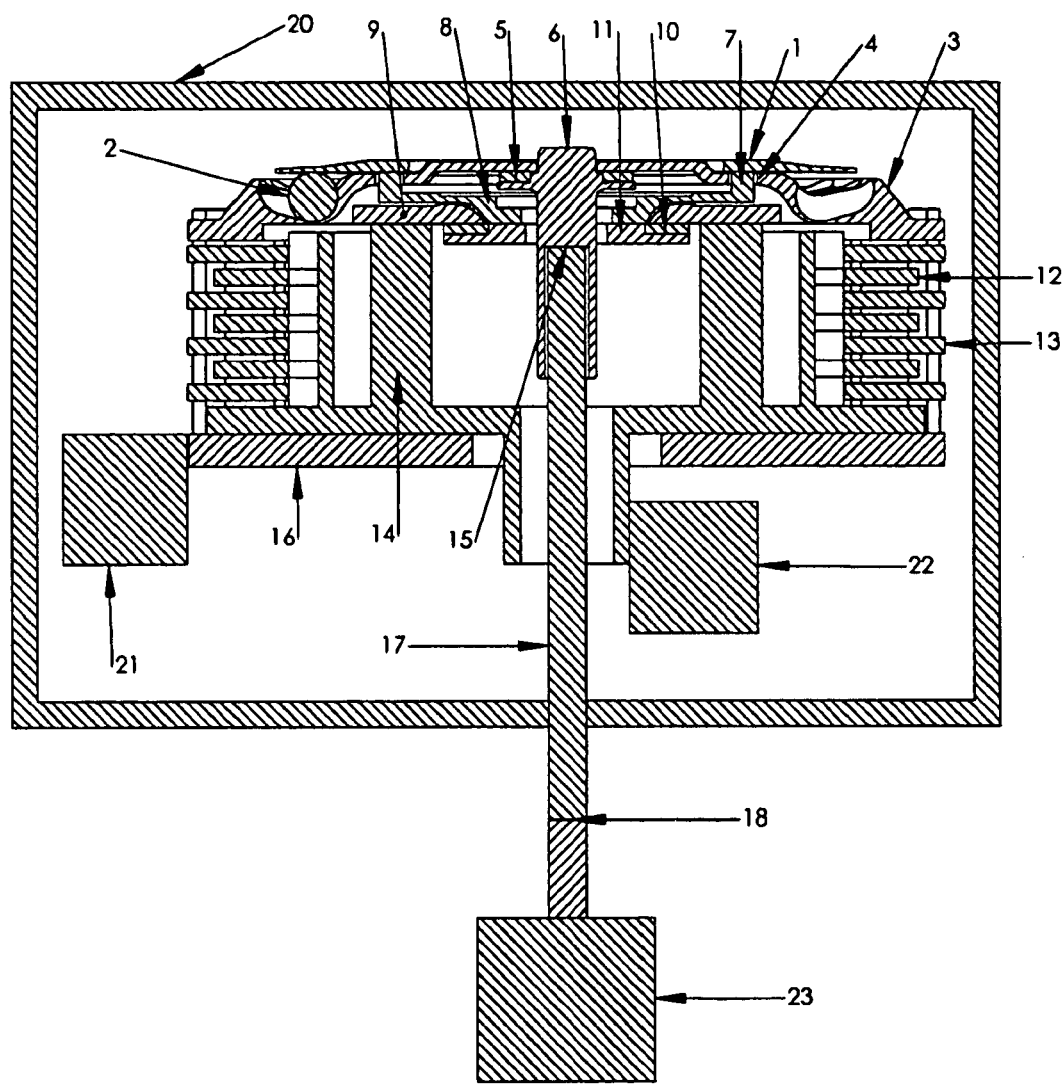
FIG. 2 is a cross-sectional view of the preferred embodiment of the present invention.

A preferred embodiment of the present invention is illustrated in FIG. 1A (rearward, exploded isometric view), FIG. 1B (forward, exploded isometric view) and FIG. 2 (cross-sectional view). The Upper Thrust (9) is sandwiched between the Rotating Hub (8), Thrust Bearing (10) and Lower Thrust (11). The Lower Thrust (11) is fixed to the bottom of the Rotating Hub (8). The Upper Thrust (9) is attached to the Clutch Inner Hub (14). The Pressure Plate (3) is sandwiched between the Top Plate (1) and the Rotating Hub (8). The Holes (4) of the Pressure Plate (3) pass over the Stand-Offs (7) of the Rotating Hub (8). The Ball(s) (2) are sandwiched between the Pressure Plate (3) and the Top Plate (1). The Lifter Thrust Bearing (5) sits on top of the Lifter (6). The Lifter Thrust Bearing (5) and Lifter (6) are sandwiched between the Pressure Plate (3) and the Rotating Hub (8). The Driven Friction Plate(s) (12) are coupled rotationally to the Clutch Inner Hub (14). The Driving Friction Plate(s) (13) are coupled rotationally to the Clutch Outer Basket (16). The Internal Edge (15) of the Clutch Lifter Actuator (17) pushes axially on the Lifter (6). The External Edge (18) of the Clutch Lifter Actuator (17) passes through the existing Engine Case (20). The Engine Power Source (21) is coupled rotationally to the Clutch Outer Basket (16). The Transmission Source (22) is coupled rotationally to the Clutch Inner Hub (14).

As the engine spins the Clutch Outer Basket (16), the centripetal force of the Balls (2) begins to overcome a spring force applied externally to the External Edge (18) of the Clutch Lifter Actuator (17) to the Pressure Plate (3) through the Lifter (6) and Lifter Thrust Bearing (5). Once the centripetal force overcomes the spring force, the Pressure Plate (3) moves axially towards the Driving Clutch Plate(s) (13) and Driven Clutch Plates (12). The force of the Pressure Plate (3) into the Driving Clutch Plates (13) and Driven Clutch Plates (12) causes the Clutch Inner Hub (14) to rotate.

Once the Pressure Plate (3) has compressed the Driving Clutch Plates (13) and Driven Clutch Plates (12), as rotational engine speed increases, the Balls (2) continue to move outward, deflecting the Top Plate (1) causing additional force to be applied to the Driving Clutch Plates (13) and Driven Clutch Plates (12) until the Balls (2) reach the end of their Channel (19). Additional rotational engine speed does not deflect the Top Plate (1) further resulting in no additional force into the Driving Clutch Plates (13) and Driven Clutch Plates (12).

The operator may pull on a clutch lever coupled to the External Edge (18) of the Clutch Lifter Actuator (17) to apply a force through the Lifter (6) and opposite the force generated by the Pressure Plate (3). The force generated by the operator pushes the Balls (2) into the Top Plate (1) causing the Top Plate (1) to deflect much like a spring and causing partial or complete clutch disengagement.

Conclusions Ramifications and Scope

The reader will see that the present invention offers many distinct advantages over the prior art. By mounting the centrifugal clutch engagement apparatus to the clutch inner hub and coupling the centrifugal clutch engagement apparatus radially to the clutch outer basket, the present invention can be easily retrofitted to a commonly produced manual clutch configuration. The force limiting design of the present invention overcomes a serious weakness in the prior art that can lead to transmission or engine failures. The ability to adjust the centrifugal clutch engagement apparatus externally through the clutch release mechanism makes the necessary adjustments to the centrifugal clutch engagement apparatus easier for the operator.

Although the description above contains many specificities, these should not be construed as limiting the scope of the invention but as merely providing illustrations of some of the presently preferred embodiments of this invention. For example, the Pressure Plate could use a weighted-arm cam arrangement to induce axial motion in response to radial motion.

Thus the scope of the invention should be determined by the appended claims and their legal equivalents rather than by the example given.

I claim:

1. A centrifugal clutch engagement apparatus, comprising:
   a clutch unit including first driving friction plates in engagement with a clutch outer basket connected to an engine power source and driven friction plates interleaved with the first driving friction plates and in engagement with a clutch inner hub penetrating through the center of said first friction plates and connected to a transmission source,
   a centrifugal pressure plate apparatus comprising an upper thrust retainer fixed to said clutch inner hub, a rotating hub rotatable relative to and substantially axially fixed relative to said upper thrust retainer, and a pressure plate coupled rotationally to said clutch outer basket and said rotatable hub,
   said centrifugal pressure plate apparatus including a means for generating increasing axial motion of said pressure plate in response to increasing rotational motion of said centrifugal pressure plate apparatus,
   whereby the increasing rotational motion of said centrifugal pressure plate apparatus in response to increasing rotational motion of said clutch outer basket causes said pressure plate to move axially and apply a force to said driving friction plates to said driven friction plates causing rotational motion of said clutch inner hub.

2. The centrifugal clutch engagement apparatus of claim 1 wherein
   said rotating hub is disposed through the center of said upper thrust retainer,
   a lower thrust retainer is attached to a bottom of said rotating hub,
   said pressure plate is disposed above said driving friction plates and said driven friction plates, and
   said pressure plate is in engagement with said clutch outer basket, the centrifugal pressure plate apparatus further comprising said pressure plate incorporating a means for increasing axial expansion force in response to increasing rotational speed, a spring force means applying a force opposite that of said pressure plate's said means for increasing axial expansion force in response to increasing rotational motion thereby preventing said pressure plate from moving axially until sufficient rotational speed is achieved, a top plate, said rotating hub including stand-offs disposed on top of and radially around the outer diameter of said rotating hub, said pressure plate including holes disposed such that said holes match the position and size of said stand-offs on said rotating hub such that said stand-offs on said rotating hub pass through said holes in said pressure plate such that said pressure plate is coupled radially to said rotating hub through said stand-offs on said rotating hub, thereby said pressure plate is able to move axially with respect to said rotating hub, k) said top plate attached to the top of said stand-offs on said rotating hub, said top plate sandwiching said pressure plate between said rotating hub and said top plate, thereby said top plate provides said pressure plate a radially coupled and axially fixed surface such that said pressure plate's said means for increasing axial expansion in response to increasing rotational speed causes said pressure plate to contact said driving friction plates and said driven friction disks whereby the increasing force of said pressure plate's said means for increasing axial expansion in response to increasing rotational speed generates friction between said driving friction plates and said driven friction disks causing rotational motion of said clutch inner hub.

3. The centrifugal clutch engagement apparatus of claim 2 further including a thrust bearing disposed between said lower thrust retainer and said upper thrust retainer.

4. The centrifugal clutch engagement apparatus of claim 2 wherein said pressure plate's said means for increasing axial expansion in response to increasing rotational speed has a limit to axial expansion and said top plate's material, shape and thickness allow said top plate to deflect and act as spring in response to continued axial expansion of said pressure plate after said pressure plate has contacted and completely compressed said driving friction plates and said driven friction plates whereby the spring force caused by the deflection of said top plate limits the total amount of compression force applied to said driving friction plates and said driven friction plates and whereby additional external force applied to said pressure plate will further deflect said top plate allowing the operator to override clutch engagment regardless of engine speed or the force generated by said centrifugal clutch engagement apparatus.

5. The centrifugal clutch engagement apparatus of 4 wherein the material, shape and thickness of said top plate and the deflection caused by additional axial motion of said pressure plate after completely compressing said driving friction plates and said driven friction plates is about the same spring force required to maintain clutch engagement at high loads and provide clutch slip under excessive loads whereby the spring force allows for normal clutch operation but protects the engine and transmission from failure due to excessive loads.

6. The centrifugal clutch engagement apparatus of claim 2 wherein said pressure plate contains a ball ramp mechanism for providing increasing axial expansion in response to increasing rotational speed.

7. The centrifugal clutch engagement apparatus of claim 6 wherein said ball ramp mechanism comprises a plurality of channels, a plurality of balls disposed in said channels, said channels disposed radially in said ball ramp mechanism, said channels sloping upward, said channels including a vertical wall at the outside edge of said channel, whereby in response to the centripetal force caused by increasing rotational speed said balls are forced outwards in said channels, said balls radial movement in said upward slope of said channels causing said balls to expand said ball ramp mechanism axially until said balls reach said vertical wall of said channels where additional centripetal force of said balls is applied into the face of said vertical wall.

8. The centrifugal clutch engagement apparatus of claim 2 further including a clutch lifter mechanism comprising:
a) a lifter,
b) said lifter incorporating a shaft and a flat circular surface near top of said shaft,
c) said lifter disposed between said rotating hub and said pressure plate,
d) a lifter thrust bearing,
e) said lifter thrust bearing disposed between said lifter and said pressure plate,
f) an engine case, said centrifugal clutch engagement apparatus contained inside of said engine case,
g) a clutch lifter actuator,
h) an internal edge of said clutch lifter actuator attached axially to said lifter, an external edge of said clutch lifter actuator exposed outside of said engine case, whereby a force applied to said external edge of said clutch lifter actuator is applied to said pressure plate through said lifter.

9. The centrifugal clutch engagement apparatus of claim 8 further including a clutch lever coupled to said clutch lifter mechanism, whereby the operator may apply a force to said clutch lever causing a force to be applied to said pressure plate decreasing the axial force said pressure plate can apply to said driving friction plates and driven friction plates causing partial or complete disengagement of said clutch unit regardless of engine speed.

10. The centrifugal clutch engagement apparatus of claim 8 including a second adjustable spring force means coupled to said clutch lifter mechanism, thereby said adjustable spring applies a force to said pressure plate through said clutch lifter mechanism, whereby the operator is able to adjust said centrifugal clutch engagement apparatus through said second adjustable spring force means without the need to remove said engine case.

11. The centrifugal clutch engagement apparatus of claim 8 further including a clutch lever coupled to said clutch lifter mechanism, a third adjustable spring force means disposed between said clutch lifter mechanism and said clutch lever, whereby said third adjustable spring force means applies a force to said pressure plate through said clutch lifter mechanism and said clutch lever can provide additional force to said pressure plate, whereby the operator is able to adjust said centrifugal clutch engagement apparatus through said third spring force means without the need to remove said engine case and whereby the operator may apply a force to said clutch lever causing a force to be applied to said pressure plate decreasing the axial force said pressure plate can apply to said driving friction plates and said driven friction plates causing partial or complete disengagement of said clutch unit regardless of engine speed.

* * * * *